UNITED STATES PATENT OFFICE.

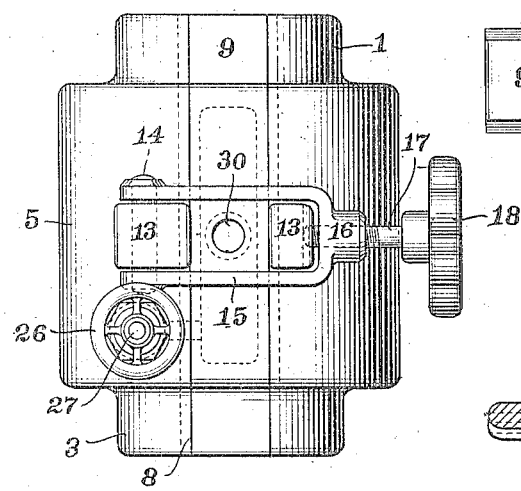

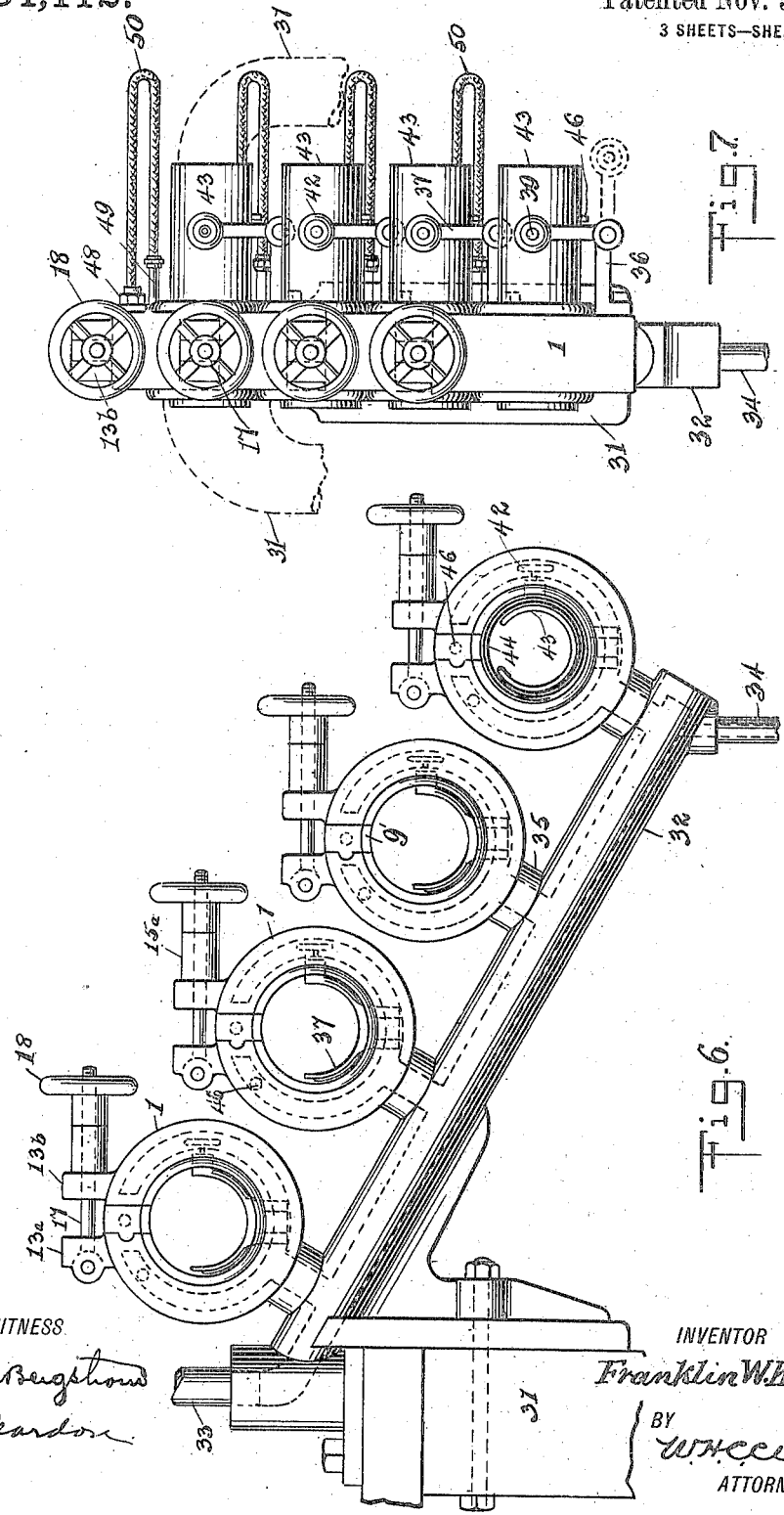

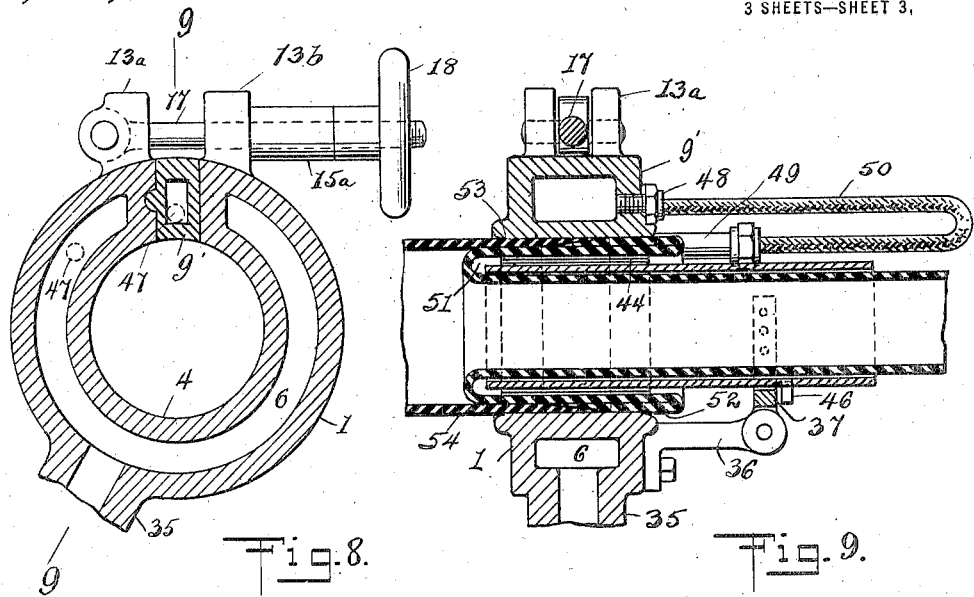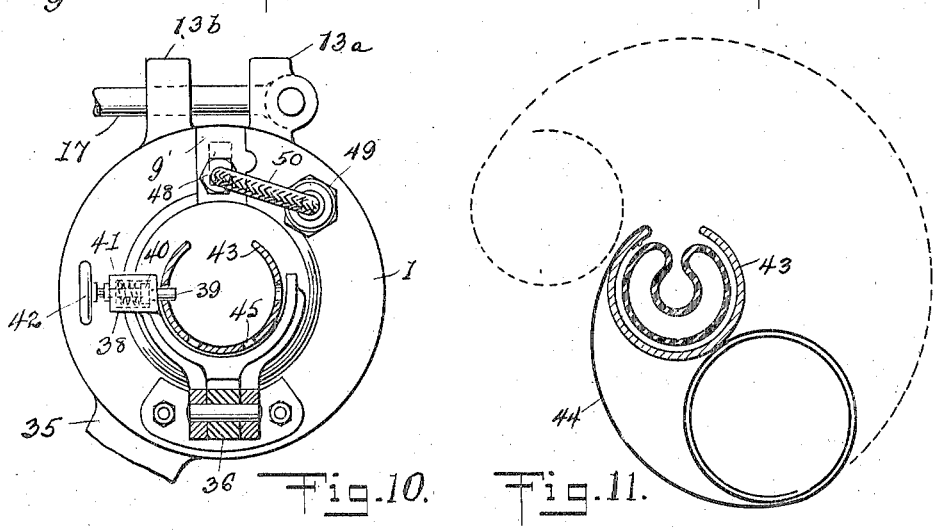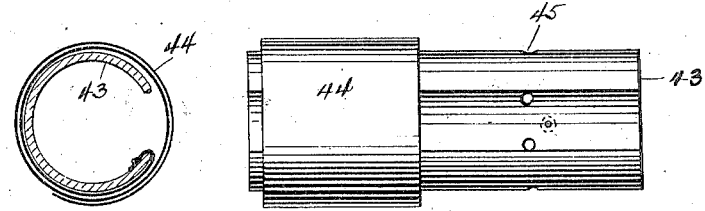

FRANKLIN W. KREMER, OF CARLSTADT, NEW JERSEY.

VULCANIZER.

1,284,112.   Specification of Letters Patent.   Patented Nov. 5, 1918.

Application filed May 23, 1916. Serial No. 99,350.

*To all whom it may concern:*

Be it known that I, FRANKLIN W. KREMER, a citizen of the United States, residing at Carlstadt, in the county of Bergen and State of New Jersey, have invented a new and useful Improvement in Vulcanizers, of which the following is a specification.

My invention relates to vulcanizing devices; and particularly to vulcanizers designed for the joining or splicing of the ends of rubber tubing used in the making of the inner tubes of automobile tires.

The primary object of my invention is to provide a vulcanizer in the shape of a casing, having open ends to receive the rubber tubing; the casing being adapted to be entirely closed around the tubing during the vulcanizing operation; and then easily and expeditiously opened when the vulcanizing is finished, to permit the tire to be removed.

Another object of my invention is to provide a vulcanizer in the shape of a casing which can be opened and closed in the manner just mentioned; and which is adapted, when closed, to provide a passage leading through the side thereof to the inside of the same; this passage being intended to receive the inflating tube for the tire; whereby the splicing of the ends of the inner tube of the tire and the application of the valve patch can be effected at the same time.

A further object of my invention is to provide a casing inclosing a space for receiving a thermal agent; the casing having an opening in its side and extending from end to end of the casing; this opening adapted to be closed by a hollow block or key formed to communicate with the space; so that the thermal agent can be admitted to the interior of the block also; the communication between the space of the casing and the interior of the block being controlled by any suitable means.

The above and other objects and advantages of my invention will appear from the following description taken in connection with the accompanying drawings; the same characters of reference being used to indicate the same parts on all views. On said drawings:

Figure 1 is a top plan of my vulcanizer;

Fig. 2 is a vertical transverse section thereof, taken centrally through Fig. 1;

Fig. 3 is a vertical longitudinal section of my vulcanizer;

Fig. 4 is a top plan of the block or key which closes my improved vulcanizer;

Fig. 5 is a longitudinal section of the block shown in Fig. 4;

Fig. 6 is a side view showing a group of my vulcanizers mounted on a support, and supplied from a common manifold;

Fig. 7 is an end view of the construction shown in Fig. 9;

Fig. 8 is a section taken through one of the vulcanizers shown in Fig. 9, illustrating the modified construction thereof:

Fig. 9 is a section on the line 9—9 of Fig. 8;

Fig. 10 is a front view of the modified vulcanizer;

Fig. 11 is a section of a spring expander used in connection with my vulcanizer;

Fig. 12 is a similar view showing the spring coiled up on the expander; and

Fig. 13 is a side elevation of this expander.

In the particular description of the drawing, I use numeral 1 to indicate the casing of my vulcanizer, which is supported upon feet 2. The casing comprises a hollow cylinder 3, having a bore 4 extending entirely through the same; and surrounding the cylinder, and preferably cast integral therewith, is a jacket 5, forming with the cylinder 3 an inclosed space 6. To this space, I supply a thermal agent such as steam by means of a pipe or tube 7. This pipe may be laid on the floor or other supporting surface upon which rest the feet 2, and preferably communicates with space 6 between the feet 2. I may also provide a suitable vent cock for the space 6; this vent not being shown on the drawings.

Extending through the side of the casing, and from end to end of the same, is an opening 8 which, as shown on the drawings, is preferably located on the upper side or top of the casing. This opening 8 permits the removal of the tire casing when the ends have been spliced and it is designed to receive and be closed by a key or block 9 which is preferably formed to be slipped into the opening 8 from either end thereof and to slide into closing position. The sides of the block or key 9 carry longitudinal ribs 10 which are received in grooves or guideways 11, these grooves or guideways being formed in the sides 12 of the opening 8, so that the block is prevented from dropping into the bore 4. This bore of course is circular and the inner face of the block 9 is curved correspondingly, so that the tire tube may fit snugly against the surface of the bore and the inside surface of the block.

The casing carries on its outside a pair of lugs 13, one of these lugs being located on each side of the opening 8. One lug 13 is perforated to receive a pivot bolt 14 which secures to said lug a yoke 15. This yoke has a central bore 16 which is threaded to receive a bolt 17 having a milled head 18. When this lug is turned down in the position shown in Figs. 1 and 2, and the bolt 17 screwed into engagement with the other lug 13, the casing will be forced against the sides of the key or block 9 and this key or block 9 thus secured tightly in the opening 8.

The interior of the block 9 is hollow, providing an inclosed space 19 having a port 20 opening through the side of the block. I also form the jacket 5 to inclose a valve chamber 21 leading through one side of the opening 8, at 22 and being located in such position that it will register with the port 20 when the block 9 is in closing relation with respect to the opening 8. The chamber 21 is separated from the space 6 by means of a web or partition 23, having a port 24 which can be opened and closed by a valve 25. This valve 25 is adjustable by means of a hand wheel 26 on the outer end of the stem 27 of this valve; this stem being threaded and engaging the threaded bore of a sleeve or bushing 28, which screws into an opening leading into the chamber 21 from the top of the casing 1; and by turning the hand wheel, the valve of course can be opened or closed at will.

The casing of course is provided with webs or walls extending along the sides of the opening 8 and closing the space 6 in this way; and I prefer to provide the block or key 9 with a centrally located passage 29 extending from the outer to the inner face thereof; and this passage is formed by joining the top and bottom of the key 9 by means of a circular web 30 and providing openings in the top or bottom so that this passage will be entirely independent and out of communication with the space 19.

The utility of my invention will now be clear. The ends of the tubing to form the inner tube of the tire are first joined in a manner to be more fully described hereinafter, and then inserted into the bore 4, through the opening 8, the key 9 inserted, and the bolt 17 is tightened to draw the sides of the opening 8 against the block 9. Steam is then admitted through the pipe 7 and into the space 6, and by opening the valve 25, the steam may also be admitted to the space 19 to effect the vulcanizing operation. After the splicing is finished, the valve 25 is first screwed shut and the screw 17 is next loosened and the yoke 15 raised. The block 9 can then be slipped out of the opening 8, steam being shut off by the closure of the valve 25 at this time, and the tire can be lifted out of the casing through the opening 8.

By providing the passage 29 through the key or block 9, I can fix the valve patch to the tire at the same time that the ends are spliced together. The valve patch will be located between the ends to be spliced and the inflation tube which is joined to the valve patch will be disposed in the passage 29, as will be readily understood by those skilled in this art. To operate in this way, it is desirable to begin by removing the block 9 and then to insert the inflating tube with the patch on the inner end thereof in the bore or passage 29. The ends of the tube can then be cemented together and to the patch; after which the tire can be slipped through the opening 8 into the bore 4 and the block 9 caused to slide into position to close the opening 8. As a next step, the tire is forced against the surface of the bore 4, and after the yoke is lowered and the bolt 17 screwed up, the valve 25 can be opened and steam admitted. After the ends of the tire tube have been joined together securely and to the valve patch, the steam can be shut off, yoke 15 raised and the key or block 9 taken out to permit the removal of the tire tube.

From the above description, it will be apparent that I have devised a very useful construction for my purpose. The casing can be readily and quickly opened to permit the tire tube to be properly disposed therein, and the operation of vulcanizing can be effected in a thorough and expeditious manner. In some cases, I might even dispense with the block 9 by making the casing sufficiently resilient to enable the sides of the opening 8 to be drawn together. In such case, I would of course dispose the bore 29 in the top of the casing by forming a semicircular groove in each side of the opening 8, locating these semicircular grooves opposite each other, so that they will form a passage through the casing into the bore 4 when the opening 8 is closed in the manner mentioned.

In Figs. 6 and 7 I show a number of vulcanizers 1 mounted so that they can be operated simultaneously. They are carried upon a support or table 31, and connected to a hollow manifold 32. Steam is supplied to the manifold by a pipe 33 and exhausted from it by a pipe 34. The vulcanizers are each connected to the manifold by necks 35.

When used in this way, the construction of the vulcanizers 1 may be slightly modified. Each will have an opening like the opening 8, but the key 9' to close the same will have only one tongue or rib 10 and the opening, but one groove or guideway 11. On top there will be lugs 13ª at one side of the opening 8, and between these lugs and pivoted thereto will be an arm 17ª, having its outer end threaded. At the opposite edge of the opening 8 will be a recessed lug 13ᵇ to receive the arm 17ª. This arm will carry a sleeve 15ª, and a hand wheel 18. When the arm is in the position shown in Fig. 6, and the hand-wheel turned up, the sleeve will be pressed against the lug 13ᵇ, and the key 9' held tightly in the opening 8. The sleeve 15ª may have threaded engagement with the arm 17, if desired; so that it may be turned up thereon to engage the lug 13ᵇ, and the wheel 18 thus used somewhat as a lock nut; or the arm may be smooth inside the sleeve, so that the sleeve will move freely toward the lug 13ᵇ when the wheel 18 is manipulated.

From each vulcanizer 1, below the bore 4 therethrough extends outward an arm 36, having pivoted at its outer end a yoke 37. One arm of this yoke carries a hollow bearing 38, in which is a spring pressed catch 39. This catch is in the form of a bolt having a collar 40 engaged by a spring 41. The bolt projects through the bearing, and the spring inside abuts against one end and the collar against the other. A knob 42 on one end of the bolt permits the manipulation thereof, so that it can be drawn back against the force of the spring 41.

This yoke is adapted to constitute a rest or support for a spring expander comprising an open ended tubular element 43; having a flat spring 44 coiled about one end. This element is split longitudinally, so as to present an opening having opposed edges through one side, and allow a tire tube to be disposed inside the element 43. A circular row of holes 45 is drilled in this tube, and it is also provided with a stop pin 46. This expander is intended to engage a tire tube and be inserted with the spring 44 into the bore 4 of the vulcanizer, and have its opposite end received in the yoke 37, so that one of the holes can be engaged by the catch 39. The stop 46, striking against the yoke 37 when the expander is inserted, enables the operator to find the correct position for the expander.

The keys 9' are hollow and have ports 47. Into these ports, which are threaded, are screwed couplings 48. The vulcanizers 1 also have such ports with couplings 49. These couplings 48 and 49 may be of any suitable construction and are joined by sections of flexible tubing 50; so that the inside of the keys 9' may be put into communication with the chambers 6.

In order to utilize the expander, I take an inner tube, and turn over outward toward one of its terminal portions to make a cuff 51, as shown in Fig. 9. I then turn the edge portion of this cuff over outward in the opposite direction, as shown at 52. This edge portion will have a beveled end which thins toward the cuff 51. I then stretch the other terminal portion 53 of the tube and slip it over the cuff 52, bending the tire double or into the form of a ring, so as to bring the two ends together. The end on the portion 53 is beveled from within outward, and will fit over the end on the edge portion of the cuff 52. These ends are cemented to hold them to each other. The tire tube remote from the cuff is then flattened, and pushed into the tubular element 43, and the spring 44 must now be wound up from the position shown in Fig. 11, and be rolled tightly around the element, as in Fig. 12. The expander is then slipped along the tire to push the spring into the cuff and between the same and the tire tube. With the parts in this position, the terminal portions of the inner tube will be moved into the bore 4 of the vulcanizer, and the spring released, will be distended, so as to force the two beveled ends into tight contact with the inside surface of the bore all around the same. The operation of vulcanizing can then be carried out. After vulcanizing, the tire tube is removed from the vulcanizer, the tube pulled out straight to make its outer surface smooth and eliminate the cuff, and the tube taken out of the expander 43.

The spring 44 will be of such temper as to allow it to be wrapped up by hand as in Fig. 10; and after it is inserted into the cuff, it may be uncoiled sufficiently to stretch the cuff by manipulating the element 43. Before so manipulating it, however, the terminal portions of the tire tube are placed in the bore 4. When the splicing of the ends of the tube is finished, and the tube removed from the vulcanizer, the spring may be coiled up again to permit the tube to be pulled out straight more easily, as will be understood. The procedure with the expander is of course the same for the vulcanizer illustrated in Figs. 1, 2, 3, 4 and 5.

I of course do not wish to be limited to the exact details of the construction hereinbefore set forth, as I may vary the same as choice or convenience dictates. I therefore wish to reserve to myself the right to make such changes in the shape, size and arrangement of the parts as fairly fall within the scope and spirit of my invention.

Having described my invention what I believe to be new and desire to secure and protect by Letters Patent of the United States is:

1. A vulcanizer, comprising an open-ended casing and means for heating the same, there being an opening through the side of the casing, a removable closure for said opening and means for drawing the respective ends of the casing peripherally against the opposite side portions of said closure.

2. A vulcanizer comprising an open ended casing having an inclosed space for a thermal agent, said casing having an opening, said opening extending from end to end of the casing, and means for closing the opening, said means having a hollow interior to communicate with the aforesaid space in the casing.

3. A vulcanizer comprising a casing having an inclosed space for a thermal agent, said casing having an opening through the side thereof, said opening extending from end to end of the casing, means for closing said opening, said means having a hollow interior adapted to be put into communication with the aforesaid space, and means for controlling said communication.

4. A vulcanizer comprising an open ended casing, means for applying a thermal agent thereto, said casing having an opening through its side and extending from end to end of the casing, and means for closing said opening, said means having a passage extending from the outer to the inner face thereof.

5. A vulcanizer comprising an open ended casing having a jacket inclosing a space for a thermal agent, said casing having an opening through the side thereof, said opening extending from end to end of the casing, the sides of said opening having grooves therein, a hollow filling block for closing said opening, the sides of said block having ribs for engaging said grooves, the block having a port to enable the interior thereof to communicate with the space aforesaid, means for controlling said communication, and means for locking the block and casing tightly together.

6. A vulcanizer comprising a casing, means for applying a thermal agent thereto, said casing having an opening through the side thereof, said opening extending from end to end of the casing, a filling block for closing said opening, a lug carried by the casing on each side of the opening, and a yoke pivoted to one lug and carrying an adjustable bolt to engage the other lug, whereby the block can be tightly secured together.

7. A vulcanizer comprising an open ended casing having a jacket inclosing a space for a thermal agent, said casing having an opening in its side extending from end to end of the casing, a block for closing said opening, said block being hollow and having a port leading to the interior thereof, said jacket also inclosing a valve chamber having a passage leading to the side of the opening, said port and said passage communicating when the block is in position with respect to said opening, a valve controlling communication between the aforesaid space and the chamber, and a wheel on the exterior of the casing for opening and closing the valve.

8. A vulcanizer comprising an open ended casing, means for applying a thermal agent to the casing, said casing having an opening through its side, said opening extending from end to end of the casing, and means for closing the opening, said casing when the opening is closed, providing a bore or passage therethrough from the inside to the outside thereof.

9. A vulcanizer having a bore therethrough, and inclosing an annular chamber, and having a hollow removable section in one side coextensive with said bore, said vulcanizer and said section having ports, couplings attached to said ports, and a tubular section connecting the couplings, whereby the chamber and the interior of the section can communicate with each other.

10. A vulcanizer having a bore therethrough, an arm at one end of said bore, a yoke pivoted to the arm, and a catch carried by the yoke.

11. A combination of a vulcanizer having a bore therethrough, an arm on the vulcanizer at one end of the bore, a yoke carried by the arm, a catch carried on the yoke, and a spring expander having one or more openings to engage the catch, and a stop to engage the yoke.

12. A vulcanizer having a bore therethrough, an opening in one side extending from one end of the bore to the other, a key having a rib to engage a groove in the side of the opening to close the latter, and a pivoted arm having a sleeve to engage a lug and draw the sides of the opening against the key.

In testimony whereof, FRANKLIN W. KREMER has signed his name to this specification this twenty seventh day of February, 1916.

FRANKLIN W. KREMER.